Nov. 11, 1958   M. F. NATHAN   2,860,102
REFORMING PROCESS
Filed Dec. 31, 1952
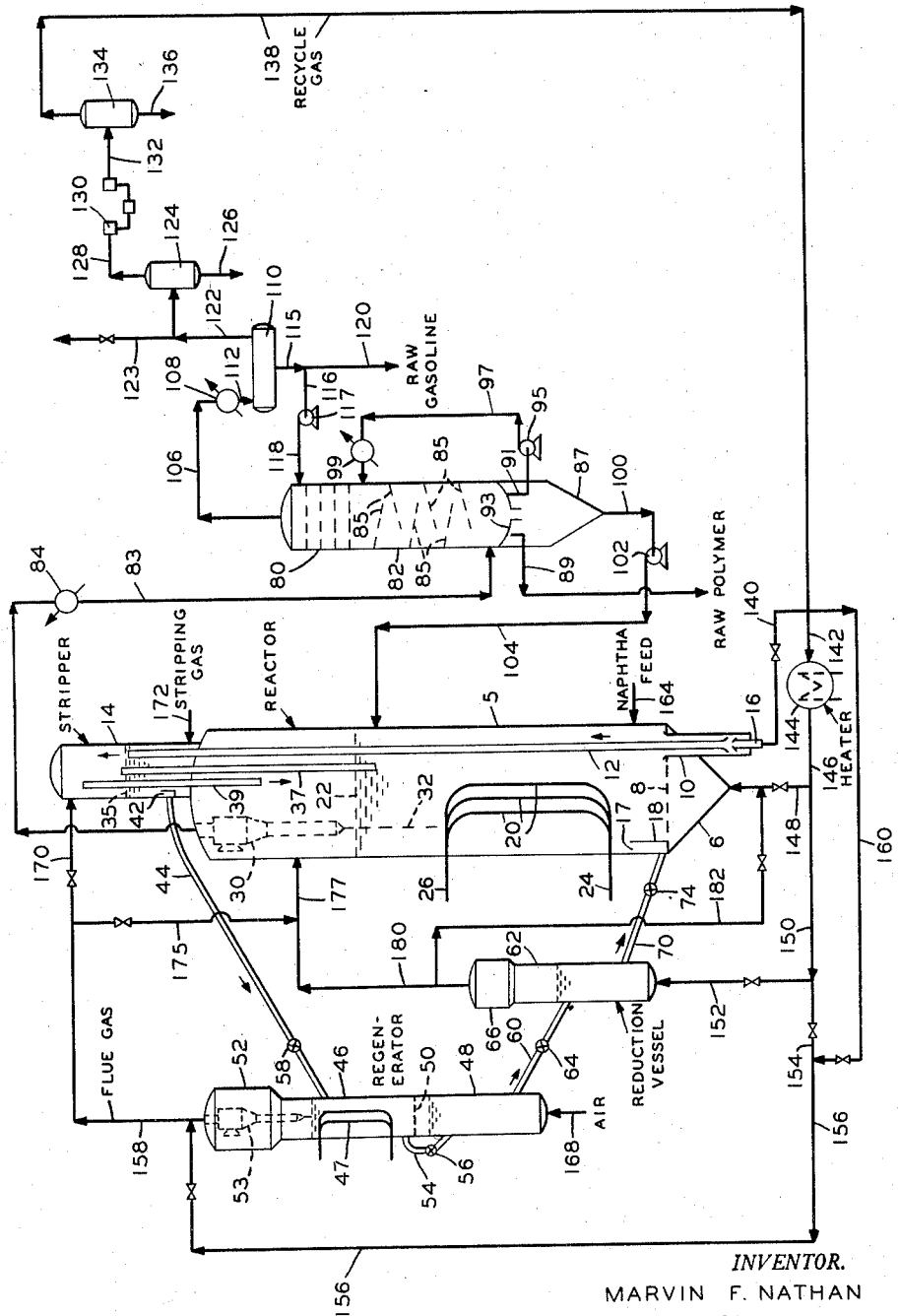
INVENTOR.
MARVIN F. NATHAN
BY G. H. Palmer
T. C. Virgil
ATTORNEYS

United States Patent Office 2,860,102
Patented Nov. 11, 1958

2,860,102

REFORMING PROCESS

Marvin F. Nathan, New York, N. Y., assignor to The M. W. Kellogg Company, Jersey City, N. J., a corporation of Delaware Application December 31, 1952, Serial No. 328,990

14 Claims. (Cl. 208—140)

This invention relates to an improved reforming process, and more particularly pertains to a reforming process for light hydrocarbon oils in which a fluidized platinum catalyst is employed.

Platinum is found to be an excellent catalyst for the reforming of light hydrocarbon oils for the production of gasoline of high anti-knock quality. Thus far, platinum has been employed commercially in a fixed bed process by reason that a fluidized operation might result in excessive loss of catalyst, and thus render the process economically unattractive for commercial use. Various techniques have been employed for overcoming this problem in a fluid operation, however, to date there has not been any proposal which would significantly decrease catalyst loss to make the process attractive. By means of the present invention, a method is suggested of effectively reducing substantially the catalyst loss in a fluidized platinum system.

In accordance with the present invention, it is proposed to operate a fluidized platinum system for reforming light hydrocarbon oils by the method which comprises combining a flue gas product resulting from the regeneration of a platinum catalyst contaminated with carbonaceous material with the vaporous reaction product, scrubbing the combined product streams to recover the catalyst fines entrained therewith, and recycling a portion of liquid reaction product having substantially all of the recovered catalyst fines included therein to the reforming zone.

The reforming reactions are conducted by passing a feed material of light hydrocarbon oil in a vaporous condition through a mass of finely divided platinum catalyst at a velocity sufficient to form a pseudo-liquid or fluidized mass of particles. Generally, the reactant materials, whether it be a feed material, the pre-reduction gas or the regeneration gas, is passed upwardly through the mass of finely divided platinum catalyst at a superficial linear gas velocity of about 0.05 to about 50 feet per second, more usually, about 0.1 to about 6 feet per second. In commercial operations, it is preferred to employ a superficial linear gas velocity of about 0.1 to about 2.5 feet per second, because an intimate contact between reactant materials and the catalyst particles is obtained. At the velocities mentioned above, the fluidized mass resulting therefrom can be in the lean or dense phase, although for the most part, it is preferred to employ a dense phase of catalyst, because of the better contact which is obtained between the solids and the gaseous material. The catalyst particles may be of any size which will produce a fluidized mass, however, generally, they are not greater than about 250 microns, more usually, they fall in the range of about 10 to about 100 microns.

The feed material which is reformed in accordance with this invention is a light hydrocarbon oil and this can be, for example, a gasoline, a naphtha and/or a kerosene. The light hydrocarbon oil can have an initial boiling point of about 85° to about 325° F. and an end point of about 300° to about 500° F. In the case of reforming a naphtha fraction, it is preferred to employ a naphtha having an initial boiling point of about 100° to about 250° F. and an end point of about 350° to about 450° F. Generally, the light hydrocarbon oil used as a feed material has a Watson characterization factor of about 11.50 to about 12.20. This light hydrocarbon oil can be a straight run or virgin stock, a cracked stock which is derived from a thermal or a catalytic cracking operation, or a mixture of straight run and cracked stocks. Generally, the octane number of the feed material can be at least about 5 CFRR clear, or more usually, about 20 to about 70 CFRR clear; whereas the olefin content of the oil can vary from about 0 to about 30 mol percent. The feed material can be derived from any type of crude oil, hence, the sulfur content can range from about 0 to about 3.0% by weight.

The platinum catalyst can be prepared in any manner for use in the present invention. The platinum concentration of the catalyst is generally about 0.05 to about 5% by weight, although higher concentrations of up to about 15% by weight, based on the total catalyst, can be employed. While improved yields of reformed liquid product can be obtained at higher platinum concentrations, nevertheless, the extent of improvement may not justify, in some cases, the high cost of manufacturing such catalysts. Usually, the platinum catalyst contains about 0.1 to about 2% by weight of platinum, and in the preferred instance, the platinum concentration varies from about 0.2 to about 0.8% by weight, based on the total catalyst. The platinum is usually supported on a carrier material such as, for example, alumina, zinc spinel, silica, magnesia, titania, zirconia, silica-alumina, alumina-magnesia, alumina-titania, pumice, fuller's earth, kieselguhr, charcoal, bauxite, alumina-thoria, etc. The carrier material generally comprises the remainder of the catalyst. An excellent support is alumina, and in some cases, it is preferred to employ therewith a small amount of silica, viz., about 0.1 to about 12% by weight of same. Silica in small proportions enhances the stability of the catalyst at elevated temperatures, and also, it serves to inhibit the nonselective cracking reactions which are manifested in excessive production of carbon and normally gaseous materials.

The light hydrocarbon oil is reformed under conditions resulting in the net production of hydrogen. A system involving the net production of hydrogen is commonly referred to as "hydroforming," and it is usually operated under such conditions that the quantity of hydrogen produced is sufficient to sustain the process without the need for extraneous hydrogen. Generally, in a reforming operation, a temperature of about 750° to about 1150° F. is employed. At this temperature, the total pressure of the operation is generally maintained at about 25 to 1000 p. s. i. g. The pressure usually determines the hydrogen partial pressure of the reforming zone, which is an important factor influencing the yield of carbon. At high pressures less carbon is produced, however, it is also true that less yield of reformed gasoline is obtained at such pressures. Hence, in the selection of a pressure, the yields of gasoline and carbon should be considered, in the light of the effects of pressure thereon. The quantity of oil processed to the reforming zone relative to the amount of catalyst employed is measured in terms of the weight space velocity, which is defined as the pounds of oil feed on an hourly basis charged to the reaction zone per pound of catalyst which is present therein. The weight space velocity can vary from about .05 to about 10. The quantity of hydrogen which is added to the process is usually measured on the basis of the standard cubic feet of hydrogen (standard conditions measured at 60° F. and 760 mm.) per barrel of oil feed in the reaction zone (1 barrel=42 gallons). On this basis, the hydrogen rate is about 100 to about 20,000 s. c. f. b. Another method of determining the quantity of hydrogen which can be present in the reforming zone is by means of the hydrogen partial pressure. In this respect, generally, the hydrogen partial pressure is about 15 to about 950 p. s. i. a. based on inlet conditions. The catalyst to oil ratio, on a weight basis, is about 0.001 to 10.

For the purposes of this invention, the reaction conditions fall within the ranges specified hereinabove, however, as previously indicated, they are selected on the basis of obtaining a net production of hydrogen. However, a preferred hydroforming process involves a temperature of about 850° to about 1050° F., a pressure of about 100 to about 740 p. s. i. g., a weight space velocity of about 0.1 to about 3, a hydrogen rate of about 1000 to about 7500 s. c. f. b., a hydrogen partial pressure of at least about 50 p. s. i. a. and up to the point at which hydrogen is consumed, and a catalyst to oil ratio, on a weight basis of about 0.005 to 2.

As a result of the reforming reactions, the catalyst becomes contaminated with a carbonaceous material which causes temporary or, in some cases, permanent deactivation of the catalyst. In order to restore the activity of the catalyst, it is treated with an oxygen containing gas at an elevated temperature. For the most part, the carbonaceous material is composed of an amorphous carbon and this form of carbon is readily burned off with an oxygen containing gas. Consequently, in the treatment of the catalyst to restore its activity, it is preferred, although not essential, to first treat the catalyst with an oxygen containing gas having an oxygen partial pressure of about 0.07 to about 75 p. s. i. a. at a temperature in the order of about 600° to about 1250° F. in order to remove mainly the carbonaceous content of the catalyst. Following this mild treatment with an oxygen containing gas, the catalyst can then be treated more severely with an oxygen containing gas having an oxygen partial pressure of more than about 3 p. s. i. a. and at a temperature of about 700° to about 1600° F. More usually, the severe treatment is conducted with an oxygen containing gas having an oxygen partial pressure of about 4 to about 400 p. s. i. a. In the matter of a severe treatment of the catalyst, three factors are important, namely, the oxygen partial pressure, the temperature and the length of treatment, and one or more of these operating conditions can be increased over what is used in the mild treatment for the severe operation. Generally, the length of the treatment can be from about 0.25 to about 400 hours. When using an oxygen partial pressure of about 4 to about 15 p. s. i. a., it is preferred to employ a temperature of about 1050° to about 1600° F. and for a period of about 1 to about 40 hours. On the other hand, when treating the catalyst with an oxygen containing gas having an oxygen partial pressure of about 14.7 to about 100 p. s. i. a, it is preferred to employ a temperature of about 950° to about 1150° F. for a period of about 15 minutes to about 10 hours. Usually, the catalyst which has undergone mild treatment has little or no carbonaceous deposit, hence, the severe treatment is effected primarily for the purpose of restoring catalytic properties which may be lost for one reason or another.

The flue gas resulting from the regeneration of the catalyst should, from the standpoint of product loss, preferably contain very little or no oxygen. This flue gas, despite the usual care taken in separating platinum catalyst fines therefrom, will have a small amount of catalyst entrained therewith. In order to decrease the loss due to the entrainment of catalyst fines in the flue gas, it is proposed to combine the flue gas with the vaporous reaction product resulting from the reforming process. If a large quantity of oxygen is present in the flue gas product, this oxygen may cause an excessive loss of product through combustion and/or it may present a hazard. Consequently, in the practice of the present invention, it is desirable that the flue gas contain not more than about 1% by volume of oxygen, preferably not more than about 0.2% by volume. In some cases, a higher concentration of oxygen than just specified can be tolerated, provided that the oxygen is consumed prior to combining the flue gas product with the vaporous reaction product in the reaction zone. Various methods can be utilized for achieving this result, however, in accordance with the present invention, it is proposed to combine the flue gas with part of the recycle gas or hydrogen containing gas which is produced in the process. In this manner, the oxygen present in the flue gas product will burn a portion of the hydrogen and/or light hydrocarbons which are present in the recycle gas, and thus little or no loss of reaction product through combustion will result from combining the two main product streams. The oxygen containing gas which is employed for the regeneration of the catalyst can be pure oxygen, air or a diluted stream of air of 1 to 10% by volume of oxygen which has been previously mixed with flue gas product or other gaseous material.

By virtue of combining the flue gas product with the reaction product, all the gases present in the flue gas other than hydrogen become contaminants in the recycle gas stream. The contaminating gases are, for example, carbon dioxide, nitrogen, carbon monoxide, argon, etc. Since the oxygen containing gas employed in the regeneration of spent platinum catalyst can be air or pure oxygen, the contaminating gases may or may not contain nitrogen. For economical reasons, air is preferred as to regeneration gas, consequently, in all likelihood nitrogen will be one of the contaminants in a commercial operation. Experimental results appear to indicate that little or no adverse effects on product distribution and quality are to be anticipated by virtue of having the contaminating gases present during the hydroforming reaction. The main problem is to operate the hydroforming process to maintain the extent of contamination within reasonable limits, otherwise it will be difficult to obtain the desired hydrogen partial pressure in the reaction zone. In this regard, the production of carbon in the system is maintained within the range of about 0.001 to about 1%, preferably about 0.01 to about 0.2%, based on the oil feed. On the other hand, operating conditions are selected on the basis of obtaining a hydrogen production of about 100 to about 3000 standard cubic feet per barrel of oil feed, preferably about 500 to about 2500 s. c. f. b. Within these ranges of carbon and hydrogen yields, the relative rates of contaminating gases introduced into the system to hydrogen produced, on a volume basis, is maintained at about 0.0004 to 0.4:1, preferably about 0.005 to 0.08:1. Within the relative rates of contaminating gases and hydrogen produced, there is no danger of failing to obtain the desired hydrogen partial pressure. This is an important consideration which is peculiar to a hydroforming process involving a platinum catalyst. Other hydroforming processes involving catalysts other than platinum could not be operated satisfactorily with flue gas recycle to the reaction zone, because the hydrogen production relative to the production of normally gaseous hydrocarbon materials is significantly less than what is obtained with a platinum catalyst and/or the catalysts are poisoned by one or more of the contaminating gases in the flue gas.

In order to obtain a better understanding of the present invention, reference will be had to a specific example, which will be described in connection with the accompanying drawing.

In the drawing, a vertical, cylindrical vessel 5 serves as a reactor, and it has a conical shaped bottom 6. At the bottom of the straight sided section of the reaction vessel 5 there is situated a circular grid 8 which covers the available cross-sectional area of the reactor vessel. Inside the bottom of the reactor, a well 10 projects above the grid plate 8, in which well there originates a vertical, cylindrical riser 12 serving as a conduit for transferring catalyst from the reactor to the stripping vessel 14, which is a vertical, cylindrical vessel superimposed thereon. The rate of catalyst being transferred upwardly in riser 12 is regulated by means of a plug valve 16, which is situated below the lower end of the riser 12. The regenerated platinum catalyst is introduced into the reaction zone by means of a well 17 situated above the grid plate 8, and which is formed by means of a vertical transverse baffle 18. Since the reforming operation involving a platinum catalyst is largely endothermic, it is proposed hereunder to employ a series of vertical heating tubes 20 as a means of furnishing the required heat of reaction. These heating tubes are submerged in the fluidized platinum bed, whose upper level is shown as line 22 in the drawing. The heating tubes have a common inlet 24 for the entrance of the heating fluid such as, for example, mercury vapor or liquid, flue gas, etc., and a common outlet 26 for the passage of the heating fluid from the tubes 20. In the top section of the reaction vessel 5, there is situated a cyclone separator 30 for the recovery of a substantial amount of entrained platinum catalyst from the reactor effluent. The separated solid material is returned to the reaction zone via a dipleg 32, which is submerged within the platinum catalyst bed.

In the stripping vessel 14, there is situated the open end of the riser 12 for the introduction of spent platinum catalyst therein. This open end of the riser 12 is shown as being below the catalyst level 35. A second conduit 37 communicates between the stripping zone and the upper part of the reaction zone. The upper open end of conduit 37 is found normally above the catalyst level 35, and the lower end is submerged within the catalyst bed in the reactor. In the event that the catalyst level in the stripper rises above the end of conduit 37, catalyst flows downwardly into the reaction zone, and thus the catalyst level in the stripper is maintained. On the other hand, the lower end of conduit 37 should preferably remain submerged in the catalyst bed of the reaction zone in order to prevent the vaporous reaction product from passing upwardly through the conduit 37 and into the stripping zone. A third conduit 39 is similarly situated such that a part is situated within the stripping zone and the lower part is situated in the reaction zone, thus the vapor zones of the two vessels communicate directly. Accordingly, the upper end of conduit 39 is located at a reasonable distance above the catalyst level 35 in order that there is little opportunity for catalyst to flow therein. On the other hand, the lower end of conduit 39 is located well above the catalyst level 22 in the reaction zone, consequently, gaseous material may freely pass from the stripping zone to the reaction zone. Catalyst is continuously withdrawn from the stripping zone through a well 42 which is located at one side of the lower section thereof. This catalyst withdrawal well is connected to a stripped catalyst standpipe 44, by means of which catalyst flows from the stripper to the upper part of section 46 of the regeneration vessel.

The stripped platinum catalyst is introduced into the top part of section 46 of the regenerator, wherein a substantial amount or all of the carbonaceous material thereon is removed through combustion with an oxygen containing gas. Within section 46 there is situated a cooling element 47, such as cooling coils, for the purpose of maintaining the temperature therein within desired limits. This section 46 of the regenerator is separated from a lower section 48 by means of a circular grid plate 50. Superimposed on section 46 is situated an enlarged, vertical section or disengaging vessel 52. A preliminary separation of entrained catalyst from the regeneration gas is effected in the disengaging zone by the resultant reduction in the superficial linear gas velocity of the upflowing gaseous material. Further separation of catalyst from the upflowing flue gas is effected by means of cyclone separator 53. Following a preliminary treatment of the catalyst in section 46, it is withdrawn from the lower part thereof through a standpipe 54, in which there is installed a slide valve 56 for automatically controlling the rate of catalyst withdrawal. A similar slide valve 58 is installed in standpipe 44, which interconnects the stripping zone with section 46. In section 48 of the regenerator, the partly or wholly regenerated catalyst is contacted with an oxygen containing gas of somewhat higher average oxygen partial pressure than exists in section 46. This is the case because some oxygen is consumed in section 48 by reason of chemical reaction with and sorption on the catalyst, and in section 46, the oxygen is consumed to a much greater extent. This serves as a more severe treatment of the catalyst with oxygen containing gas in order that the catalytic properties of the catalyst are substantially improved or restored. After the catalyst has been contacted with an oxygen containing gas in section 48, it is withdrawn from the lower section thereof through a standpipe 60, and thence it is passed to a reduction vessel 62. The rate of catalyst withdrawal from section 48 of the regenerator is automatically controlled by means of a slide valve 64, which is situated in standpipe 60. The upper section of the reduction vessel 62 is composed of an enlarged, vertical section 66 in which a separation of entrained catalyst from the upflowing gas by reduction in superficial linear gas velocity is effected. After the catalyst has remained in the reduction vessel for a desired period of time, it is withdrawn from the bottom part thereof through another standpipe 70, and it is passed into inlet well 18, which is located within the bottom part of the inside of reactor 5. The rate of catalyst withdrawal from reduction vessel 62 is automatically controlled by means of a slide valve 74, which is situated in standpipe 70.

A preliminary separation of reformed gasoline product is effected in a vessel which is comprised of two sections, namely, an upper fractionating section 80 and a lower scrubbing section 82. The combined vaporous reaction product and flue gas leaving the cyclone separator 30, which is located in the upper part of the reactor vessel 5, is passed to the lower part of scrubbing section 82 by means of a line 83. The combined product stream in line 83 is lowered in temperature by means of a cooler 84 which is in line 83. This product stream contains catalyst fines which are later separated in the form of a slurry for return to the reaction vessel. The vaporous feed to the scrubbing section 82 passes upwardly through inwardly slanting baffles 85 in countercurrent contact with a descending high boiling liquid condensate. The descending liquid scrubs the catalyst fines from the upflowing vaporous reaction product, and also, it condenses a portion of the product which boils in essentially the same range as the downflowing liquid. The descending liquid laden with catalyst fines settles in the bottom part of the fractionating tower, which is comprised of a conical shaped section 87. The liquid containing catalyst fines is allowed to settle in section 87 such that a clear supernatant liquid forms. A portion of the supernatant liquid is withdrawn through a line 89, which is located in the upper part of section 87. A liquid filter may be used to prevent the inclusion of catalyst fines in the supernatant liquid product, although this is not shown in the drawing. The clear supernatant liquid is termed the raw polymer, and it represents the liquid product which boils above about 400° F. In some instances, the polymer can remain as part of the gasoline product and used as such. The raw polymer which is yielded through line 89 is further processed for the removal of lower boiling components therefrom, and this feature is not shown in the drawing. In another part of section 87, another portion of the supernatant liquid or raw polymer is withdrawn through a line 91, which is connected to a tray 93, which tray is situated across the vessel just above section 87. The raw polymer product which is withdrawn through line 91 is first transported by means of a pump 95, through a line 97, and a cooler 99, and then to the top part of scrubbing section 82. As previously indicated, the cooled polymer serves to scrub the catalyst fines from the upflowing reaction product, and also to condense a portion of the product which boils in the polymer range. A slurry of catalyst fines is withdrawn from the bottom of section 87 through a line 100, and it is transported by means of pump 102 through a line 104, which is openly connected to the reaction vessel 5 below catalyst level 22.

From the top of fractionating section 80, there is withdrawn a relatively lighter boiling vaporous product through a line 106, and this material is condensed by means of a cooler 108, prior to passing into an accumulator 110 by means of a line 112. The overhead stream is a raw gasoline product which is liquefied and collected in accumulator 110, and this material is withdrawn from the bottom thereof by means of line 115. A portion of the gasoline product is passed through line 116, and then recycled to the top of fractionating section 80 by means of a line 118. The other portion of the gasoline product is yielded as a raw product of this process through a line 120, and it is further processed in equipment which is not shown in the drawing. The normally gaseous product material is removed from the accumulator 110 by means of an overhead line 122, which is connected to a separator 124. The normally gaseous product, which is in excess of that required as recycle, is vented from the system through a valved line 123. Any liquid which is entrained in the gaseous product is removed from the bottom of the separator by means of a line 126. The remaining gaseous product is removed overhead from the separator 124 through a line 128, prior to being compressed by means of compressor 130. As a result of compression, some liquid is formed, consequently, the compressed product is passed through a line 132 and thence into a second separator 134. Liquid condensate is removed from the bottom of the separator by means of a line 136; whereas the compressed gaseous material containing substantial quantities of hydrogen is removed overhead from the separator by means of a line 138.

The compressed gas containing substantial amounts of hydrogen is recycled to the processing zones previously described. A portion of the recycle gas is passed through a valved line 140 which is connected to the bottom of the plug valve 16, thus serving to transport spent catalyst from the reaction zone to the stripping zone by means of riser 12. If desired, this recycle gas serving as a carrier stream may be preheated prior to entering the plug valve 16. Another portion of the recycle gas is passed through a line 142, and thence into a heater 144, for the purposes of raising the gas temperature, mainly as a means of furnishing part of the heat of reaction for the reforming operation. The heated recycle gas passes through line 146 and valved line 148, before entering the bottom section 6 of the reaction zone. Another portion of the heated recycle gas may, if desired, flow from line 150, through a valved line 152 and then into the bottom of the reduction vessel 62. Also, if desired, a portion of the heated recycle gas may pass through a valved line 154 and be transferred through line 156 for admixture with the flue gas leaving the top of the regenerator through a line 158. However, it is preferred to combine the flue gas with an unheated recycle gas, consequently, this gas stream is supplied through a valved line 160, which is connected to line 156, previously mentioned. The heater 144, which serves to preheat the recycle gas, can also serve to vaporize the naphtha feed for introduction into the bottom of the reactor through a line 164.

The regeneration of the platinum catalyst is conducted by means of an oxygen containing gas stream such as, for example, air. The air is first supplied in a heated condition to section 48 through a line 168 in order that the partly or wholly regenerated catalyst can be relatively more severely treated with oxygen prior to being reduced with a hydrogen containing gas. The air may be supplied in an unheated condition. In some cases, it may be desirable to recycle a portion of the flue gas for admixture with the air stream in order to maintain a lower concentration of oxygen in the treating gas. The flue gas resulting from the regeneration of the platinum catalyst is passed overhead from section 52, through a valved line 158 and it can flow through a valved line 170, which is connected to the top of stripper 14. This technique may be preferred in some cases, because any oxygen which might be present in the flue gas will be readily diluted in the stripper effluent prior to flowing to the top of the reactor through conduit 39. The stripping gas is introduced into the bottom part of stripper 14 through a line 172, and after it has served to remove volatile carbonaceous material from the catalyst, it mixes with the flue gas. Another alternative method is to recycle the flue gas directly to the top of the reaction zone through a valved line 175 and line 177. In such cases, it is preferred to recycle the flue gas at a relatively lower temperature directly to the top of the reaction zone in order to minimize adverse product distribution through excessive thermal cracking which might take place therein. This effect is further enhanced by passing the hydrogen containing gas which is employed in the reduction vessel to the reaction zone, through an overhead valved line 180, which interconnects with line 177 previously described. Another important advantage of this invention is to utilize all or part of the reduction vessel effluent leaving through line 180 as the entire hydrogen supply or part thereof which is needed for the hydroforming reaction. In such a case, the effluent in line 180 is passed to line 148 via a valved line 182.

In operation, a naphtha feed having an initial boiling point of 120° F. and an end point of 410° F. is charged at the rate of 9000 B. P. S. D. in a vaporous condition at a temperature of 950° F. through line 164, which is connected to the bottom of reactor 5. Recycle gas having about 83.3 volume percent of hydrogen and 1.7 volume percent of nitrogen is introduced into the bottom of the reactor through line 148 at the rate of 2000 s. c. f. b. at a temperature of 1050° F. The quantity of catalyst which is maintained in the reaction zone is sufficient to give a weight space velocity of about 1.6. The temperature in the reaction zone is approximately 935° F. and the pressure is maintained at about 175 p. s. i. g. Freshly regenerated catalyst is introduced into the bottom of the reactor through line 17 at the rate of 3500 pounds per hour, and this catalyst has an average carbon content of about 0.01% by weight. The catalyst to oil ratio on a weight basis is about 0.036:1. Another stream of recycle gas is passed to the plug valve 16 at the rate of 18,000 standard cubic feet per hour, and it serves to transport spent platinum catalyst through riser 12 to the stripping zone. This recycle gas may have a temperature of about 700° to about 1350° F. In the stripper, the catalyst is stripped by means of a recycle gas which is supplied through line 172 at the rate of 4000 standard cubic feet per hour, although this stripping gas rate may vary from about 2000 to about 20,000 standard cubic feet per hour. This stripping gas is introduced at a temperature of 1050° F., and the temperature can be from about 850° to about 1250° F. The stripped catalyst is supplied to section 46 of the regenerator, wherein a temperature of 1050° F. is maintained and a pressure of 180 p. s. i. g. exists. In this section 46, the average oxygen partial pressure is about 22 p. s. i. a. The average carbon content of the catalyst entering this section is about 1.4% by weight. After the platinum catalyst has acquired an average oxygen content of about 0.05% by weight, it is transferred to the lower section 48 of the regenerator, and in this section 48 the average oxygen partial pressure is about 42 p. s. i. a., the temperature is about 950° F. and the pressure is about 185 p. s. i. g. Air is introduced into the bottom end of section 48 by line 168 at the rate of 10,000 standard cubic feet per hour and at a temperature of 250° F. Since it is difficult to obtain efficient regeneration and yet produce a flue gas which is free of oxygen, it may be desirable to supply recycle gas for combination with the flue gas. To insure effective regeneration of the catalyst, generally, the flue gas will have about 0.05 to about 0.5% by volume of oxygen. Hence, it is necessary to supply recycle gas in an amount sufficient to consume substantially all the oxygen present in the flue gas. In this example, the flue gas contains 0.1% by volume of oxygen and, therefore, the recycle gas is supplied through line 160 and line 156 at the rate of 100 standard cubic feet per hour. The temperature of the recycle gas being supplied through line 160 may vary from about 90° to about 150° F. so that the resultant gas stream including the flue gas may have a temperature of about 700° to about 1050° F. prior to entering another processing vessel. Another important consideration is to maintain the amount of catalyst which is entrained with the flue gas below a certain level relative to the rate of catalyst circulating from the regeneration to the reaction zone. The catalyst entrained in the flue gas ultimately is circulated to the reaction zone, and this catalyst for the most part has been only mildly treated with an oxygen containing gas in section 46 of the regenerator. Practically none of the entrained catalyst comes from section 48 of the regenerator, wherein a severe treatment of catalyst is accomplished with an oxygen containing gas. Consequently, it is preferred to maintain the relative rates of entrained catalyst in the flue gas and of catalyst being circulated from the regenerator to the reaction vessel, on a weight basis, in the order of about 0.002 to about 0.10 part of the latter to one part of the former and more usually, the ratio is in the order of about 0.005 to about 0.02:1 on a similar basis.

The regenerated catalyst is fed into the reduction vessel wherein it is contacted with a hydrogen containing gas at the rate of 15 standard cubic feet of hydrogen per pound of platinum catalyst. Generally, the hydrogen containing gas is used in an amount of about 1 to about 400 standard cubic feet of hydrogen per pound of catalyst, and the treatment is conducted at a temperature of about 750° to about 1150° F. The pressure of pre-reduction of catalyst is usually in the same range as the pressure of the reforming operation. In this example, the reduction of catalyst is conducted at a temperature of 1000° F. and a pressure of 193 p. s. i. g. The combined flue gas and reaction product in the gaseous state is fed to scrubbing section 82 through line 83. This combined product stream is at a temperature of 937° F., although it can vary from about 750° to about 1000° F. The temperature in the bottom of the scrubbing section is about 450° F. and it exists at a pressure of about 170 p. s. i. g. The temperature at the top of the scrubbing section is about 440° F. The temperature at the top of the fractionating section 80 is about 400° F. The polymer which is yielded through line 89 at the bottom of scrubbing section 82 has an API gravity of about 10.0. The gravity of this product varies considerably depending upon the feed stock employed in the reforming operation, as well as the boiling point of the gasoline product desired. Accordingly, the API gravity of the raw polymer can vary from about 5 to about 40. This raw polymer is also used for transporting the recovered catalyst fines to the reaction zone. The catalyst fines are recovered in section 87 at the bottom of the scrubbing section at the rate of about 400 pounds per hour, and are transported with about 10 barrels per hour of raw polymer. This slurry of catalyst fines is recycled to the reaction zone through a line 104. The slurry of fines is shown as being recycled to a point in the bed of catalyst in the reaction zone. An alternative to this procedure is to recycle the slurry to a point above the catalyst bed in order that the polymer does not contact the catalyst. In this way, little or no adverse effects on product distribution and quality are obtained by virtue of the additional contact between polymer and catalyst. To facilitate this procedure, the slurry can be preheated before entering the reactor, in order to lessen the chance of liquid polymer reaching the catalyst bed before vaporization. The preheating of slurry can be used in the case of recycling the slurry to the catalyst bed directly in order to shorten the period of contact between catalyst and polymer. The overhead product from fractionating section 80 is cooled to a temperature of about 110° F. by means of condenser 108. The raw gasoline product has a density of about 50° API. The normally gaseous product following compression by means of compressor 130 contains about 1.7% by volume of nitrogen and 83.3% by volume of hydrogen. The recycle gas in line 138 is at a temperature of 120° F. and a pressure of 210 p. s. i. g.

Having thus provided a description of my invention by furnishing a specific example thereof, it should be understood that no undue limitations or restrictions are to be imposed by reason thereof, but that the scope of the present invention is defined by the appended claims.

I claim:

1. A process which comprises contacting a light hydrocarbon oil with a fluidized mass of finely divided platinum catalyst in a reaction zone under suitable reforming conditions such that a vaporous reaction product including gasoline, hydrogen and a relatively higher boiling hydrocarbon material than gasoline is produced and the catalyst becomes contaminated with carbonaceous material, separating the vaporous reaction product from the mass of platinum catalyst such that only a relatively small quantity of catalyst remains entrained therewith, withdrawing at least a portion of the contaminated catalyst from the reaction zone and passing the same to a regeneration zone wherein it is contacted with an oxygen containing gas in a fluidized state under conditions suitable for the substantial removal of carbonaceous material therefrom and thus producing a flue gas product, separating the flue gas product from the regenerated catalyst such that only a relatively small quantity of catalyst remains entrained therewith, combining the separated flue gas product and the separated vaporous reaction product, subjecting the combined product streams to a separation treatment whereby a condensate of the high boiling hydrocarbon material having included therein substantially all of the catalyst fines is obtained and a gasoline fraction as well as a normally gaseous product including the hydrogen are recovered, recycling a portion of the relatively high boiling liquid condensate including the catalyst fines to the reaction zone, and recycling at least a portion of the normally gaseous product to the reaction zone, the relative quantities of hydrogen produced and of flue gas product being such that flue gas contamination of the recycle gas does not have a significant adverse effect upon the reforming reaction.

2. A process which comprises contacting a light hydrocarbon oil with a fluidized mass of finely divided platinum catalyst in a reaction zone under suitable reforming conditions such that a vaporous reaction product including gasoline, hydrogen and a relatively higher boiling hydrocarbon material than gasoline is produced and the catalyst becomes contaminated with carbonaceous material, separating the vaporous reaction product from the mass of platinum catalyst such that only a relatively small quantity of catalyst remains entrained therewith, withdrawing at least a portion of the contaminated catalyst from the reaction zone and passing the same to a regeneration zone wherein it is contacted with an oxygen containing gas in a fluidized state under conditions suitable for the substantial removal of carbonaceous material therefrom and thus producing a flue gas product, separating the flue gas product from the regenerated catalyst such that only a relatively small quantity of catalyst remains entrained therewith, combining the separated flue gas product and the separated reaction product, subjecting the combined product streams to a separation treatment whereby a condensate of the high boiling hydrocarbon material having included therein substantially all of the catalyst fines is obtained and a gasoline fraction as well as a normally gaseous product including the hydrogen are recovered, recycling a portion of the relatively high boiling liquid condensate including the catalyst fines to the reaction zone, and recycling at least a portion of the normally gaseous product to the reaction zone, the ratio of flue gas to hydrogen produced on a volumetric basis being about 0.0004 to about 0.4:1.

3. A process which comprises contacting a light hydrocarbon oil with a fluidized mass of finely divided platinum catalyst in a reaction zone under suitable reforming conditions such that a vaporous reaction product including gasoline, hydrogen and a relatively higher boiing hydrocarbon material than gasoline is produced and the catalyst becomes contaminated with carbonaceous material, separating the vaporous reaction product from the mass of platinum catalyst such that only a relatively small quantity of catalyst remains entrained therewith, withdrawing at least a portion of the contaminated catalyst from the reaction zone and passing the same to a regeneration zone wherein it is contacted with an oxygen containing gas in a fluidized state under conditions suitable for the substantial removal of carbonaceous material therefrom and thus producing a flue gas product, separating the flue gas product from the regenerated catalyst such that only a relatively small quantity of catalyst remains entrained therewith, combining the separated flue gas product and the separated vaporous reaction product, contacting the combined product streams with a high boiling liquid hydrocarbon material to remove by scrubbing the catalyst fines included therein and condense substantially all of the high boiling hydrocarbon material of essentially the same boiling characteristics, removing a portion of the high boiling liquid hydrocarbon material containing substantially all of the catalyst fines and recycling the same to the reaction zone, separating the gasoline fraction from a normally gaseous product material including the hydrogen, and recycling at least a portion of the normally gaseous product to the reaction zone, the ratio of flue gas to hydrogen produced being about 0.005 to about 0.08:1.

4. A process which comprises contacting a light hydrocarbon oil with a fluidized mass of finely divided platinum catalyst in a reaction zone under suitable reforming conditions such that a vaporous reaction product including gasoline, hydrogen and a relatively higher boiling hydrocarbon material than gasoline is produced and the catalyst becomes contaminated with carbonaceous material, separating the vaporous reaction product from the mass of platinum catalyst such that only a relatively small quantity of catalyst remains entrained therewith, withdrawing at least a portion of the contaminated catalyst from the reaction zone and passing the same to a regeneration zone wherein it is contacted with an oxygen containing gas in a fluidized state under conditions suitable for the substantial removal of carbonaceous material therefrom and thus producing a flue gas product, further contacting the catalyst substantially free of carbonaceous material with an oxygen containing gas under severe conditions of treatment such that the catalytic properties thereof are substantially restored, contacting the catalyst thus treated with a hydrogen containing gas under reducing conditions, separating the flue gas product from the regenerated catalyst such that only a relatively small quantity of catalyst remains entrained therewith, combining the separated flue gas product and the separated reaction product, subjecting the combined product streams to a treatment whereby the entrained catalyst fines are scrubbed therefrom with a high boiling liquid hydrocarbon and substantially all the high boiling hydrocarbon product material is condensed therefrom and thus producing a slurry of substantially all the catalyst fines in a portion of the high boiling hydrocarbon product material, separating a normally gaseous product including hydrogen from the gasoline product, recycling a portion of the high boiling hydrocarbon product including substantially all of the catalyst fines to the reaction zone, and recycling at least a portion of the normally gaseous product to the reaction zone, the process being operated such that the ratio of flue gas to hydrogen produced is about 0.005 to about 0.08:1.

5. A process which comprises contacting a light hydrocarbon oil with a fluidized mass of finely divided platinum catalyst in a reaction zone under suitable reforming conditions such that a vaporous reaction product including gasoline, hydrogen and a relatively higher boiling hydrocarbon material than gasoline is produced and the catalyst becomes contaminated with carbonaceous material, separating the vaporous reaction product from the mass of platinum catalyst such that only a relatively small quantity of catalyst remains entrained therewith, withdrawing at least a portion of the contaminated catalyst from the reaction zone and passing the same to a regeneration zone wherein it is contacted with an oxygen containing gas in a fluidized state under conditions suitable for the substantial removal of carbonaceous material therefrom and thus producing a flue gas product, separating the flue gas product from the regenerated catalyst such that only a relatively small quantity of catalyst remains entrained therewtih, combining the separated flue gas product and the separated vaporous product, subjecting the combined product streams to a separation treatment whereby a condensate of the high boiling hydrocarbon material having included therein substantially all of the catalyst fines is obtained and a gasoline fraction as well as a normally gaseous product including the hydrogen are recovered, recycling a portion of the relatively high boiling liquid condensate including substantially all of the catalyst fines to the reaction zone at a point above the location of the fluidized mass of catalyst therein, and recycling at least a portion of the normally gaseous product to the reaction zone, the process being operated such that the ratio of flue gas to hydrogen produced is about 0.005 to about 0.08:1.

6. A process which comprises contacting a light hydrocarbon oil with a fluidized mass of finely divided platinum catalyst in a reaction zone under suitable reforming conditions such that a vaporous reaction product including gasoline, hydrogen and a relatively higher boiling hydrocarbon material than gasoline is produced and the catalyst becomes contaminated with carbonaceous material, separating the vaporous reaction product from the mass of platinum catalyst such that only a relatively small quantity of catalyst remains entrained therewith, withdrawing at least a portion of the contaminated catalyst from the reaction zone and passing the same to a regeneration zone wherein it is contacted with an oxygen containing gas in a fluidized state under conditions suitable for the substantial removal of carbonaceous material therefrom and thus producing a flue gas product having not more than about 1% by volume of oxygen therein, separating the flue gas product from the regenerated catalyst such that only a relatively small quantity of catalyst remains entrained therewith, combining the separated flue gas product with a hydrogen containing gas derived from a source hereinafter mentioned and existing at a lower temperature such that the excess oxygen contained in the flue gas is consumed and the temperature of the resultant mixture is lowered substantially, combining the mixture thus obtained with the separated vaporous reaction product, subjecting the combined product streams to treatment whereby the catalyst fines are scrubbed from the combined product streams by means of a high boiling hydrocarbon material and substantially all of the high boiling product material is condensed therefrom thus producing a condensate of the high boiling product material containing substantially all of the catalyst fines, separating the normally gaseous product including the hydrogen from the gasoline product, recycling a portion of the high boiling liquid product including substantially all of the catalyst fines to the reaction zone, recycling a portion of the normally gaseous product to the reaction zone, and using a portion of the normally gaseous product for admixture with the separated flue gas product, the process being operated such that the ratio of flue gas product to hydrogen produced is about 0.005 to about 0.08:1.

7. A process which comprises contacting a light hydrocarbon oil with a fluidized mass of finely divided platinum catalyst in a reaction zone under suitable reforming conditions such that a vaporous reaction product including gasoline, hydrogen and a relatively higher boiling hydrocarbon material than gasoline is produced and the catalyst becomes contaminated with carbonaceous material, separating the vaporous reaction product from the mass of platinum catalyst such that only a relatively small quantity remains entrained therewith, withdrawing at least a portion of the contaminated catalyst from the reaction zone and passing the same to a regeneration zone wherein it is contacted with an oxygen containing gas in a fluidized state under conditions suitable for the substantial removal of carbonaceous material therefrom and thus producing a flue gas product, contacting the catalyst substantially free of carbonaceous material with an oxygen containing gas under severe conditions of treatment such that the catalytic properties thereof are substantially restored, contacting the catalyst thus treated wih a hydrogen conaining gas in a reduction zone under reducing conditions, removing an effluent from the reduction zone comprising a hydrogen containing gas, recycling the reduction zone effluent to the lower part of the fluidized mass of catalyst in the reaction zone, separating the flue gas product from the regenerated catalyst such that only a relatively small quantity of catalyst remains entrained therewith, combining the separated flue gas product and the separated vaporous reaction product, contacting the combined product streams with a high boiling hydrocarbon material to scrub the catalyst fines therefrom and condense substantially all of the high boiling hydrocarbon product thus producing a slurry of substantially all the catalyst fines in a portion of the high boiling liquid hydrocarbon product, separating a normally gaseous product including the hydrogen from the gasoline product, recycling the slurry of catalyst fines to the reaction zone, and recycling at least a portion of the normally gaseous product to the reduction zone, the process being operated under such conditions that the ratio of flue gas product to hydrogen produced is about 0.005 to about 0.08:1.

8. A process which comprises contacting a light hydrocarbon oil with a fluidized mass of finely divided platinum catalyst in a reaction zone under suitable reforming conditions such that a vaporous reaction product including gasoline, hydrogen and a relatively higher boiling hydrocarbon material than gasoline is produced and the catalyst becomes contaminated with carbonaceous material, separating the vaporous reaction product from the mass of platinum catalyst such that only a relatively small quantity of catalyst remains entrained therewith, withdrawing at least a portion of the contaminated catalyst from the reaction zone and passing the same to the regeneration zone where it is contacted with an oxygen containing gas in a fluidized state under conditions suitable for the substantial removal of carbonaeous material therefrom and thus producing a flue gas having not more than about 0.2% by volume of oxygen, separating the flue gas product from the regenerated catalyst such that only a relatively small quantity of catalyst remains entrained therewith, mixing the separated flue gas product with a hydrogen containing gas derived from a source hereinafter mentioned in order to consume the excess oxygen contained in the flue gas, combining the mixture thus obtained with the separated vaporous reaction product, contacting the combined product streams with a high boiling liquid hydrocarbon in order to scrub the catalyst fines therefrom and condense all of the high boiling hydrocarbon product and thus produce a slurry of substantially all the catalyst fines in a portion of the high boiling hydrocarbon product, separating a normally gaseous product including the hydrogen from the gasoline product, recycling the slurry of catalyst fines to the reaction zone, recycling at least a portion of the normally gaseous product to the reaction zone, and using a portion of the normally gaseous product for admixture with the flue gas product, the process being operated under such conditions that the ratio of flue gas product to hydrogen produced is about 0.0004 to about 0.4:1, a carbon yield is about 0.001 to about 1% and hydrogen production is about 100 to about 3000 s. c. f. b.

9. The process of claim 8 wherein the ratio of flue gas product to hydrogen produced is about 0.005 to about 0.08:1, carbon yield is about 0.2% and hydrogen produced is about 500 to about 2500 s. c. f. b.

10. A process which comprises contacting a light hydrocarbon oil with a fluidized mass of finely divided platinum catalyst in a reaction zone under suitable reforming conditions such that a vaporous reaction product including gasoline, hydrogen and a relatively higher boiling hydrocarbon material than gasoline is produced and the catalyst becomes contaminated with carbonaceous material, separating the vaporous reaction product from the mass of platinum catalyst such that only a relatively small quantity of catalyst remains entrained therewith, withdrawing at least a portion of the contaminated catalyst from the reaction zone and passing the same to a regeneration zone wherein it is contacted with an oxygen containing gas in a fluidized state under conditions suitable for the substantial removal of carbonaceous material therefrom and thus producing a flue gas product having not more than about 0.2% oxygen, contacting the catalyst substantially free of carbonaceous material with an oxygen containing gas under severe conditions of treatment such that the catalytic properties are substantially restored, contacting the catalyst thus treated with a hydrogen containing gas in a reduction zone under reducing conditions, separating the flue gas product from the regenerated catalyst such that only a relatively small quantity of catalyst remains entrained therewith, combining the separated flue gas product with the reduction zone effluent comprising a substantial quantity of hydrogen in order to consume the excess oxygen present in the flue gas, combining the mixture of flue gas and reduction zone effluent with the separated vaporous reaction product above the fluidized mass of catalyst in the reaction zone, contacting the combined product streams with a high boiling liquid hydrovarbon in order to scrub the catalyst fines therefrom and condense substantially all of the high boiling hydrocarbon product and thus produce a slurry of substantially all the catalyst fines in a portion of the high boiling hydrocarbon liquid product, separating a normally gaseous product including the hydrogen from the gasoline product, recycling the slurry of catalyst fines to the reaction zone, recycling a portion of the normally gaseous product to the reaction zone, and recycling another portion of the normally gaseous product to the reduction zone, the process being operated under such conditions that the ratio of flue gas to hydrogen produced is about 0.005 to about 0.008:1.

11. The process of claim 1 wherein the oxygen containing gas is air.

12. The process of claim 1 wherein the light hydrocarbon oil is a naphtha fraction.

13. A process which comprises contacting a light hydrocarbon oil with a fluidized mass of finely divided platinum catalyst in a reaction zone under suitable reforming conditions such that a vaporous reaction product including gasoline, hydrogen and a relatively higher boiling hydrocarbon material than gasoline is produced and the catalyst becomes contaminated with carbonaceous material, separating the vaporous reaction product from the mass of platinum catalyst such that only a relatively small quantity of catalyst remains entrained therewith, withdrawing at least a portion of the contaminated catalyst from the reaction zone and passing the same to the first regeneration zone wherein it is contacted with an oxygen containing gas derived from a source hereinafter mentioned in a fluidized state under conditions suitable for the substantial removal of carbonaceous material therefrom and thus producing a flue gas product, contacting the catalyst substantially free of carbonaceous material with an oxygen containing gas in a second regeneration zone under severe conditions of treatment such that the catalytic properties are substantially restored, passing the effluent comprising an oxygen containing gas from the second regeneration zone to the first regeneration zone, contacting the catalyst thus treated in the second regeneration zone with a hydrogen containing gas in a reduction zone under reducing conditions, separating the flue gas product from the regenerated catalyst such that only a relatively small quantity of catalyst remains entrained therewith, combining the separated flue gas product and the separated vaporous reaction product, contacting the combined product streams with a high boiling liquid hydrocarbon material to scrub the catalyst fines therefrom and condense substantially all of the high boiling hydrocarbon product and thus produce a slurry of substantially all the catalyst fines in a portion of the high boiling liquid hydrocarbon product, separating a normally gaseous product including the hydrogen from the gasoline product, recycling the slurry of catalyst fines to the reaction zone, and recycling at least a portion of the normally gaseous product to the reaction zone, the process being operated under such conditions that the ratio of flue gas product to hydrogen produced is about 0.005 to about 0.08:1.

14. A process which comprises contacting a light hydrocarbon oil with a fluidized mass of finely divided platinum catalyst in a reaction zone under suitable reforming conditions such that a vaporous reaction product including gasoline, hydrogen and a relatively higher boiling hydrocarbon material than gasoline is produced and the catalyst becomes contaminated with carbonaceous material, separating the vaporous reaction product from the mass of platinum catalyst such that only a relatively small quantity of catalyst remains entrained therewith, withdrawing at least a portion of the contaminated catalyst from the reaction zone and passing the same to a regeneration zone wherein it is contacted with an oxygen containing gas in a fluidized state under conditions suitable for the substantial removal of carbonaceous material therefrom and thus producing a flue gas product, contacting the catalyst substantially free of carbonaceous material with an oxygen containing gas under severe conditions of treatment such that the catalytic properties are substantially restored, contacting the catalyst thus treated with a hydrogen containing gas in a reduction zone under reducing conditions, passing the reduced catalyst to the reaction zone, separating the flue gas product from the regenerated catalyst such that only a relatively small quantity of catalyst remains entrained therewith, the ratio of entrained catalyst in the flue gas product to the reduced catalyst being passed to the reaction zone being about 0.002 to about 0.1:1 on a weight basis, combining the separated flue gas product and the separated vaporous reaction product, contacting the combined product streams with a high boiling liquid hydrocarbon to scrub the catalyst fines therefrom and condense substantially all of the high boiling hydrocarbon product and thus produce a slurry of substantially all of the catalyst fines in a portion of the high boiling liquid hydrocarbon product, separating a normally gaseous product including hydrogen from the gasoline product, recycling the slurry of catalyst fines to the reaction zone, and recycling at least a portion of the normally gaseous product to the reaction zone, the process being operated under such conditions that the ratio of flue gas product to hydrogen produced is about 0.005 to about 0.08:1.

References Cited in the file of this patent

UNITED STATES PATENTS

| | | |
|---|---|---|
| 2,366,372 | Voorhees | Jan. 2, 1945 |
| 2,449,027 | Voorhies | Sept. 7, 1948 |
| 2,449,095 | Wheeler et al. | Sept. 14, 1948 |
| 2,602,771 | Munday et al. | July 8, 1952 |
| 2,606,878 | Haensel | Aug. 12, 1952 |
| 2,663,676 | Cardwell | Dec. 22, 1953 |
| 2,665,239 | Howard et al. | Jan. 8, 1954 |

UNITED STATES PATENT OFFICE
CERTIFICATE OF CORRECTION

Patent No. 2,860,102                     November 11, 1958

Marvin F. Nathan

It is hereby certified that error appears in the printed specification of the above numbered patent requiring correction and that the said Letters Patent should read as corrected below.

Column 3, line 55, after "1150° F." insert -- and --; column 4, line 28, for "as to" read -- as the --; column 13, line 34, for "wih" read -- with --; column 14, line 18, after "0.4:1," strike out "a"; line 57, for "hydrovarbon" read -- hydrocarbon --; column 16, line 46, list of references cited, after "Cardwell" insert -- et al. --.

Signed and sealed this 17th day of February 1959.

(SEAL)
Attest:

KARL H. AXLINE                                ROBERT C. WATSON
Attesting Officer                            Commissioner of Patents